(12) United States Patent
Lowe et al.

(10) Patent No.: US 10,954,948 B1
(45) Date of Patent: Mar. 23, 2021

(54) DC MOTOR CONTROLLER FOR CEILING FAN MOTOR AND LIGHTS

(71) Applicant: Chien Luen Industries Co., Ltd., Inc., Oakland Park, FL (US)

(72) Inventors: Tien S. Lowe, Cooper City, FL (US); Charles E. Bucher, Tampa, FL (US); Zachary Zauhar, Oakland Park, FL (US)

(73) Assignee: Chen Luen Industries CO., LTD., INC., Oakland Park, FL (US)

( * ) Notice: Subject to any disclaimer, the term of this patent is extended or adjusted under 35 U.S.C. 154(b) by 0 days.

(21) Appl. No.: 16/524,948

(22) Filed: Jul. 29, 2019

Related U.S. Application Data

(60) Provisional application No. 62/712,482, filed on Jul. 31, 2018.

(51) Int. Cl.
| | |
|---|---|
| *F04D 25/08* | (2006.01) |
| *G08C 17/00* | (2006.01) |
| *F21V 33/00* | (2006.01) |
| *F04D 27/00* | (2006.01) |
| *H05B 47/19* | (2020.01) |

(52) U.S. Cl.
CPC ......... *F04D 25/088* (2013.01); *F04D 27/004* (2013.01); *F21V 33/0096* (2013.01); *G08C 17/00* (2013.01); *H05B 47/19* (2020.01); *G08C 2201/93* (2013.01)

(58) Field of Classification Search
CPC ..... F04D 25/088; F04D 27/004; H05B 47/19; G08C 17/00; G08C 2201/93; F21V 33/0096

USPC ................... 340/13.24; 315/224, 210; 307/3
See application file for complete search history.

(56) References Cited

U.S. PATENT DOCUMENTS

| | | | | |
|---|---|---|---|---|
| 4,719,446 | A * | 1/1988 | Hart ..................... | H05B 47/155 340/12.32 |
| 5,099,193 | A * | 3/1992 | Moseley ................ | G08C 17/00 323/324 |
| 5,189,412 | A | 2/1993 | Mehta et al. | |
| 5,340,277 | A | 8/1994 | Whitaker | |
| 5,365,154 | A | 11/1994 | Schneider et al. | |
| 5,541,584 | A | 7/1996 | Mehta et al. | |
| 5,613,832 | A | 3/1997 | Su | |
| 5,738,496 | A | 4/1998 | Mehta | |
| 6,120,262 | A * | 9/2000 | McDonough .......... | H05B 47/19 417/424.1 |
| 7,369,060 | B2 * | 5/2008 | Veskovic ............... | H05B 41/38 340/4.3 |

(Continued)

*Primary Examiner* — Nam V Nguyen
(74) *Attorney, Agent, or Firm* — Brian S. Steinberger; Hilary F. Steinberger; Law Offices of Brian S. Steinberger, P.A.

(57) ABSTRACT

Systems, devices, controllers and methods for providing a DC (direct current) motor controller for ceiling fans, that can include retrofitting a DC motor controlled ceiling fan with a single remote control device. Another embodiment is for providing a DC motor controller for ceiling fans, that can include retrofitting a DC motor controlled ceiling fan with a single remote control device within the ceiling fan with a WiFi control device within the ceiling fan. Other embodiments can include using combinations of a wireless remote controller with a smart phone and with mechanical switches and/or with hardwired wall mounted controls, and the like.

20 Claims, 6 Drawing Sheets

(56) References Cited

U.S. PATENT DOCUMENTS

| | | | |
|---|---|---|---|
| 7,425,805 B2 * | 9/2008 | Hsu | F04D 25/088 |
| | | | 318/16 |
| 7,615,898 B2 | 11/2009 | Chang | |
| 7,652,439 B2 | 1/2010 | Tang | |
| 7,964,989 B1 * | 6/2011 | Puschnigg | G06F 1/266 |
| | | | 307/38 |
| 8,068,014 B2 * | 11/2011 | Steiner | H04L 1/1812 |
| | | | 340/12.38 |
| 8,831,584 B2 * | 9/2014 | Almeda | H04M 1/72533 |
| | | | 455/418 |
| 9,181,750 B2 | 11/2015 | Ticoalu et al. | |
| 9,465,377 B2 * | 10/2016 | Davis | H04L 67/125 |
| 9,547,299 B2 * | 1/2017 | Chen | H05B 47/19 |
| 9,730,303 B1 * | 8/2017 | Lin | H05B 45/10 |
| 9,736,911 B2 * | 8/2017 | Taipale | H05B 47/185 |
| 9,859,833 B1 * | 1/2018 | Cook | H02P 27/16 |
| 9,929,876 B2 * | 3/2018 | Davis | H04L 67/125 |
| 9,985,436 B2 * | 5/2018 | Courtney | H05B 47/155 |
| 10,178,747 B1 | 1/2019 | Rivera et al. | |
| 10,429,869 B2 * | 10/2019 | Davis | H04W 84/18 |
| 2006/0044154 A1 | 3/2006 | Liao | |
| 2014/0244063 A1 * | 8/2014 | Davis | G05B 15/02 |
| | | | 700/297 |

\* cited by examiner

DC MOTOR CONTROLLER FOR CEILING FAN MOTOR AND LIGHTS

RELATED APPLICATIONS

This application claims the benefit of priority to U.S. Provisional Patent Application Ser. No. 62/172,482 filed Jul. 31, 2019, which is incorporated by reference in its' entirety.

FIELD OF INVENTION

This invention relates to ceiling fans, and in particular to systems, devices, controllers and methods for providing a DC (direct current) motor controller for ceiling fans, that can include retrofitting a DC motor controlled ceiling fan with a single remote control device within the ceiling fan with or without a WiFi control device within the ceiling fan, wherein the remote control device can allow the user to send commands to the single remote-control device through a transmitter or smart device, such as a smart phone and the like, or IOT (internet of things) device.

BACKGROUND AND PRIOR ART

Generally, conventional ceiling fans are run by AC (alternating current) powered motors with pull chains. While popular, conventional AC motors can have low efficiency and require increased power consumption. Most ceiling fans have controls for operation at different speeds, which results in increased power consumption and poor efficiency.

Running AC (alternating current) motors over extended periods of time can result in the motors heating up and potentially reducing the lifespan of the insulating materials in the motor. Ceiling fans require long periods of being run, which further exasperates the heating problem results from running AC motors which can lessen the lifespan of the ceiling fan.

DC (direct current) motors typically run cooler than AC motors and are up to three times more efficient, run quieter, and have longer lifespans than AC motors. Over the years attempts have been made to try to incorporate ceiling fans with DC motors. See for example, U.S. Pat. No. 7,615,898 to Chang and U.S. Pat. No. 7,652,439 to Tang.

Traditionally DC motor controllers have typically been remote controlled devices and not pull chain controlled which is also mentioned in the prior art, as shown in Tang '439. The problem with a pull chain controlled fan is that it leaves the end user with no way to add on a remote-control device.

Chang '898 requires the use of an elaborate DC motor comprising a unique motor made of a permeable material and integrated by a secondary production process that can be costly when used with a ceiling fan system.

Tang '439 describes a "Changeover Device of Pull Cord Control and Wireless Remote Control for a DC Brushless-Motor Ceiling Fan", title, having two embodiments. The first embodiment shown in FIG. 4 requires two separate wireless units. Wireless unit 413 connected to the pull cord-control unit and a second wireless receiving-and-sending apparatus 61 for receiving control signals from a wireless controller 62. Additionally, this embodiment as seen in FIG. 52 shows the use of the wireless controller 61 has separate power lines coming into the unit (see upper extending lines) compared to separate power lines (see upper extending lines) passing into the top of extension tube 20. Thus, Tang' 439 requires two wireless controllers and requires separate power lines to run the wireless control unit which are separate from the power lines supplying power to the fan motor.

Thus, the need exists for solutions to the above problems with the prior art.

SUMMARY OF THE INVENTION

A primary objective of the present invention is to provide systems, devices, controllers and methods for providing a DC (direct current) motor controller for ceiling fans, that can include retrofitting a DC motor controlled ceiling fan with a single remote control device in the ceiling fan A secondary objective of the present invention is to provide systems, devices, controllers and methods for providing a DC (direct current) motor controller for ceiling fans, that can include retrofitting a DC motor controlled ceiling fan with a single remote control device within the ceiling fan along with a WiFi control device in the ceiling fan.

A third objective of the present invention is to provide end users with devices, systems and controllers that can communicate to the single remote-control device. These devices can be smart devices such as smart phones, tablets, and the like, or IOT (internet of things) devices. Additionally, it could provide the user with a standard radio transmitter that can work alongside a smart device.

A fourth objective is to give the end users a path to integrate to cloud services or join an existing smart home environment.

A fifth objective of the present invention is to improve on the prior art use of using a connector in the canopy, as in U.S. Pat. No. 7,652,439 to Tang. Underwriters Laboratories, (UL) requires all wiring to fit inside the canopy due to the electrical connections. The TANG '439 patent makes it difficult to achieve this requirement by adding additional wiring within the canopy. The improvement of the Tang '439 patent is in the form of removing the extra wiring but still maintaining the ability to communicate to the DC controller located in the body of the fan.

A sixth objective of the present invention is to improve on U.S. Pat. No. 7,652,439 to Tang of using only using pull chain or only using remote control device. The improvement would allow users to control the DC fan with a pull chain and also with a remote-control device. This improvement would then allow the end user to be able to quickly control the fan locally through the pull chain or remotely. The prior art disables the pull chain device once the connector is attached. The current improvement would keep both options.

A seventh objective of the present invention is to allow the use of the remote control device outside the fan which the prior art to U.S. Pat. No. 7,652,439 to Tang never mentions. The use of the remote control device outside the fan could be located at the wall control. This additional option allows the continued use of this device where a canopy is too small to fit the remote control device or give the user a wall control option or allow the use of the remote control device for outdoor use.

An embodiment of a DC (direct current) motor controller for a ceiling fan, can include an internal power supply inside of a ceiling fan, the power supply having an AC (alternating current) to DC (direct current) converter for converting an external AC power supply to a DC power supply; a power line communications module inside the ceiling fan electrically connected to an AC (alternating current) portion of the internal power supply, a brushless DC (direct current) motor for rotating ceiling fan blades, a DC motor drive unit connected between a DC portion of the internal power supply and the brushless DC motor, a DC powered microcontroller connected between the power line communications module and the motor drive unit, and a mechanical switch for operating the ceiling fan.

The mechanical switch can include at least one of an on and off switch, a speed control switch and a reverse switch. The mechanical switch can include at least one pull chain switch.

A ceiling fan light can be connected to the external AC power supply.

The DC motor controller can include a ceiling fan motor housing for housing the internal DC power supply and the power line communications and the brushless DC motor and the motor drive unit and the microcontroller.

The DC controller can include a single remote control device inside of a ceiling fan canopy, a second internal power supply inside the ceiling fan canopy for converting the external AC power supply to a second DC power supply, a second power line communications module inside the ceiling fan canopy connected to an AC portion of the second internal power supply, a second DC powered microcontroller connected between the second power line communications module and the single remote control device, and a wireless remote control device for communicating remotely with the single remote control device inside the ceiling fan to control operating of the ceiling fan.

The DC motor controller can include a ceiling fan light connected to the external AC power supply.

The DC motor controller can include a light controller inside the ceiling fan canopy connected between the second power supply for controlling the ceiling fan light by the wireless remote control.

The light controller controls can turn the ceiling fan light on and off by the wireless remote control. The light controller controls can be used for dimming the ceiling fan light to different brightness levels by the wireless remote control.

The DC motor controller can include a WiFi control device inside of the ceiling fan canopy, and a portable digital device for remotely operating the ceiling fan by communicating with the WiFi control device. The portable digital device includes: a smart phone.

The DC motor controller can include a ceiling fan light connected to the external AC power supply. The DC motor controller can include a light controller inside the ceiling fan canopy connected between the second power supply for turning the ceiling fan light on and off by the wireless remote control. The DC motor controller can include a light controller inside the ceiling fan canopy connected between the second power supply for dimming the ceiling fan light to different brightness levels by the wireless remote control.

The DC motor controller can include a wall mount control hardwired to the external AC power supply, fan controls on the wall mount control for controlling operation of the ceiling fan, and a light controller on the wall mount control for turning the ceiling fan light on and off.

The DC motor controller can include a wall mount control hardwired to the external AC power supply, fan controls on the wall mount control for controlling operation of the ceiling fan, and a light controller on the wall mount control for dimming the ceiling fan light to different brightness levels.

The DC motor controller can include a wireless remote control for controlling operation of the fan, wherein the fan is controlled by the pull chain and the wireless remote control Further objects and advantages of this invention will be apparent from the following detailed description of the presently preferred embodiments which are illustrated schematically in the accompanying drawings.

BRIEF DESCRIPTION OF THE FIGURES

The drawing figures depict one or more implementations in accord with the present concepts, by way of example only, not by way of limitations. In the figures, like reference numerals refer to the same or similar elements.

DESCRIPTION OF THE PREFERRED EMBODIMENTS

Figure 1:
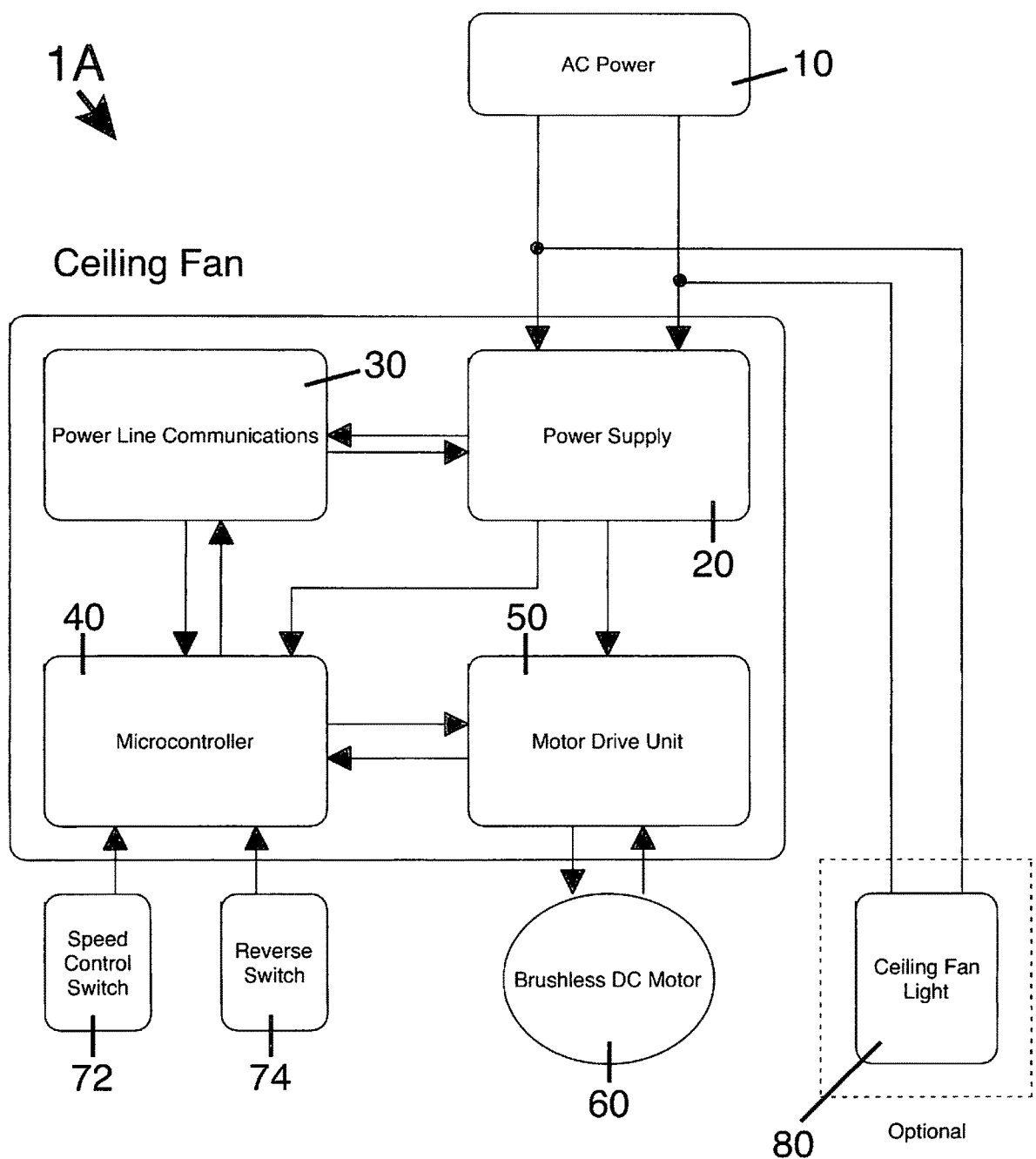
FIG. 1 is a block diagram of a first embodiment of the present invention using a brushless DC motor with an AC powered ceiling fan.

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary above and in the Detailed Description of Preferred Embodiments and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

Although specific advantages have been enumerated above, various embodiments may include some, none, or all of the enumerated advantages.

Other technical advantages may become readily apparent to one of ordinary skill in the art after review of the following figures and description.

It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Unless otherwise specifically noted, articles depicted in the drawings are not necessarily drawn to scale.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

A list of components will now be described.

1A First Embodiment Ceiling Fan with Brushless DC Motor.
1B First Embodiment Ceiling Fan with Brushless DC Motor and wall control with fan controls.
1C First Embodiment Ceiling Fan with Brushless DC Motor and wall control with fan controls and light control.
10 AC (alternating current) power supply
20 Internal Power Supply with AC/DC converter that converts external AC power to DC (direct current) power
30 Power Line Communications module
40 Microcontroller
50 Motor Drive Unit
60 Brushless DC (direct current) Motor
72 Speed control switch
74 Reverse switch
80 Optional Ceiling fan light
90 Wall control with fan controls
95 Wall control with fan controls and light controls
100 Second embodiment with single remote control and single wireless device
105 wireless remote control
110 remote control device
120 Second Internal Power Supply with AC/DC converter that converts external AC power to DC (direct current) power
130 power line communications module
140 microcontroller
180 light controller
200 third embodiment
205 smart device, such as a smart phone
210 cloud
220 WiFi control device
300 fourth embodiment
310 Wall control with fan controls and light control First Embodiment FIG. 1 is a block diagram of a first embodiment 1A of the present invention using a brushless DC (direct current) motor 60 along with an AC (alternating current) powered ceiling fan. An AC (alternating current) power supply 10 can supply power to a power supply 20 (such as an AC/DC converter) inside of a ceiling fan. The power supply 20 can supply DC power to a motor drive unit which can run a brushless DC (direct current) motor 60 that rotates ceiling fan blades (not shown). The DC motor powered ceiling fans can include those described in the background of the subject patent application, such as U.S. Pat. No. 7,615,898 to Chang and U.S. Pat. No. 7,652,439 to Tang, which are incorporated by reference in their entirety.

A speed control switch 72, that can turn the fan on and off, and adjust the rotational speed of the rotating fan blades can be connected to the microcontroller 40. The switch 72 can also include a pull chain, and the like.

A second switch 74 can be a reverse switch and be operated to turn the fan blades to either be rotating clockwise or have the blades to rotate counter-clockwise. The switch 74 can also be connected to the microcontroller 40.

Power line communications module 30 can be and include a 2-wire system where AC power is typically approximately 110 VAC, approximately 60 Hz or approximately 120 VAC, approximately 60 Hz or approximately 220 VAC, approximately 50 Hz.

Figure 2:
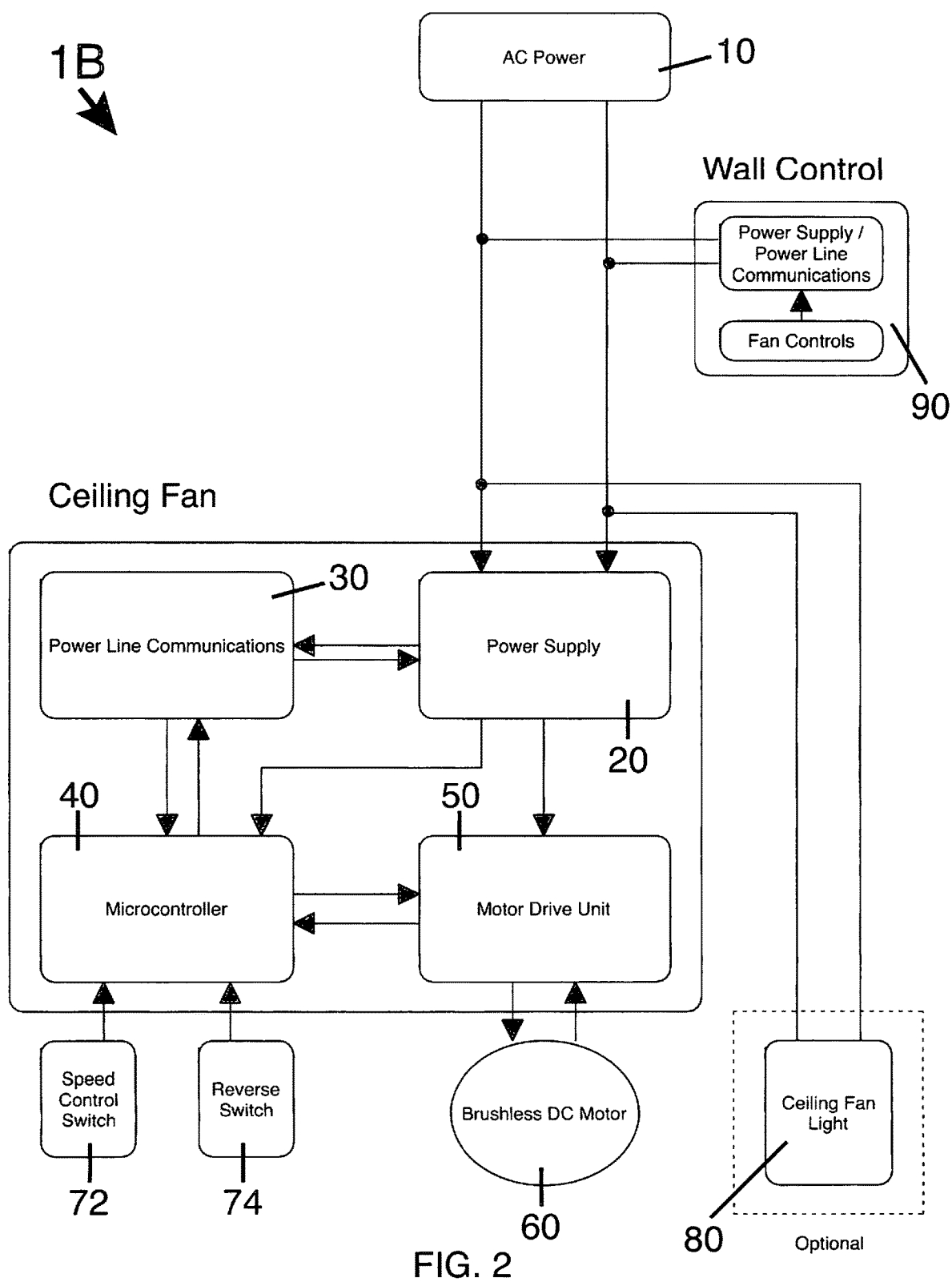
FIG. 2 is another block diagram of the first embodiment of FIG. 1 using a brushless DC motor with an AC powered ceiling fan, and wall control having fan controls.

AC power coming into the power supply 20 from AC power 10 is coupled to the power line communications module 30 to extract and decipher signals from a remote controller such as the optional wall control 90 (FIG. 2).

DC power from the power supply 20 can power the microcontroller 40 and the motor drive unit 50. This 2-wire system can then have a signal ride along the power which is communicated by the remote controller and is interpreted by the power line communications module 30 and microcontroller 40. Additionally, a bi-directional method of communication may be used as well in another embodiment.

Another embodiment of the power line communication can be represented by a circuit on a remote-control device. The circuit would create a signal using the X10 protocol which adds a high frequency signal on top of the approximately 110 VAC, approximately 60 Hz or approximately 120 VAC, approximately 60 Hz line. The signal then is read by the DC controller by filtering out the approximately 60 Hz aspect and then reading the higher frequency left behind. Based on the X10 protocol this would occur at the zero-crossing point where relatively nothing is happening.

Another embodiment is the remote controller would power ON and then power OFF the AC power to the DC controller. Inside the DC controller there would be a capacitor in the power line communications module 30 which the voltage is read. Depending on the voltage and the timing would indicate if a command has been sent. Different combinations of ON and OFF would produce a unique signal that a microcontroller would interpret the commands. These commands include but not limited to Speed 1-9 and reverse.

The power line communication module 30 is essential by keeping the same wiring typically used in AC remote control devices. By keeping the wiring count low in the canopy, it allows it to be used in a standard canopy mount installation. This avoids having to create special canopies to accommodate extra wiring that is used in Tang '439 prior art patent but is not addressed. This also takes into consideration the standard downrod diameter used for most ceiling fans. If extra wiring was present than the existing 3 wires (POWER, NEUTRAL and LIGHT) currently used for AC fans, then the difficulty of guiding more than 3 wires through the tube would make user installation very difficult at the very least, if not impossible because there would be an excess of wires.

Microcontroller 40 can be a general-purpose logic controller which other components on the circuit would respond to by changing their state from ON to OFF. The main purpose of the microcontroller is to control the various aspects of the motor drive unit 50 by telling the unit which coils need more and when. In addition, it will also interpret the speed control switch 72 and the reverse switch 74 and the power line communication module 30.

In another embodiment the microcontroller 40 on top of the previous functions will also provide feedback to the power line communication module 30. This would allow the remote control device to know the state. This function is important when there are multiple transmitters or a combination of transmitter and smart device and is in reference to bi-directional communication mentioned.

Power line communications module 30 can include such as but not limited to those described and shown in U.S. Pat. No. 5,189,412 to Mehta et al. and U.S. Pat. No. 5,365,154 to Schneider et al. and U.S. Pat. No. 7,652,439 to Tang, which are each incorporated by reference in their entirety.

Microcontroller 40 can include similar components such as but not limited to those described and shown in U.S. Pat. No. 7,615,898 to Chang and U.S. Pat. No. 7,652,439 to Tang, which are each incorporated by reference in their entirety.

FIG. 2 is a block diagram of another version 1B of the present invention shown in FIG. 1 using a brushless DC motor 60 with an AC powered ceiling fan of FIG. 1 retrofitted with a wall control device 90.

The wall control device 90 can be located in a standard switch receptacle and control the ceiling fan through the power line communications 90, sending the signal to the power line communications module 30 in the ceiling fan to control the brushless DC (direct current) motor 60. The wall control device 90 can be hardwired as shown with fan controls that can include but is not limited to toggle switches, push buttons, slide switches, and the like.

Figure 3:
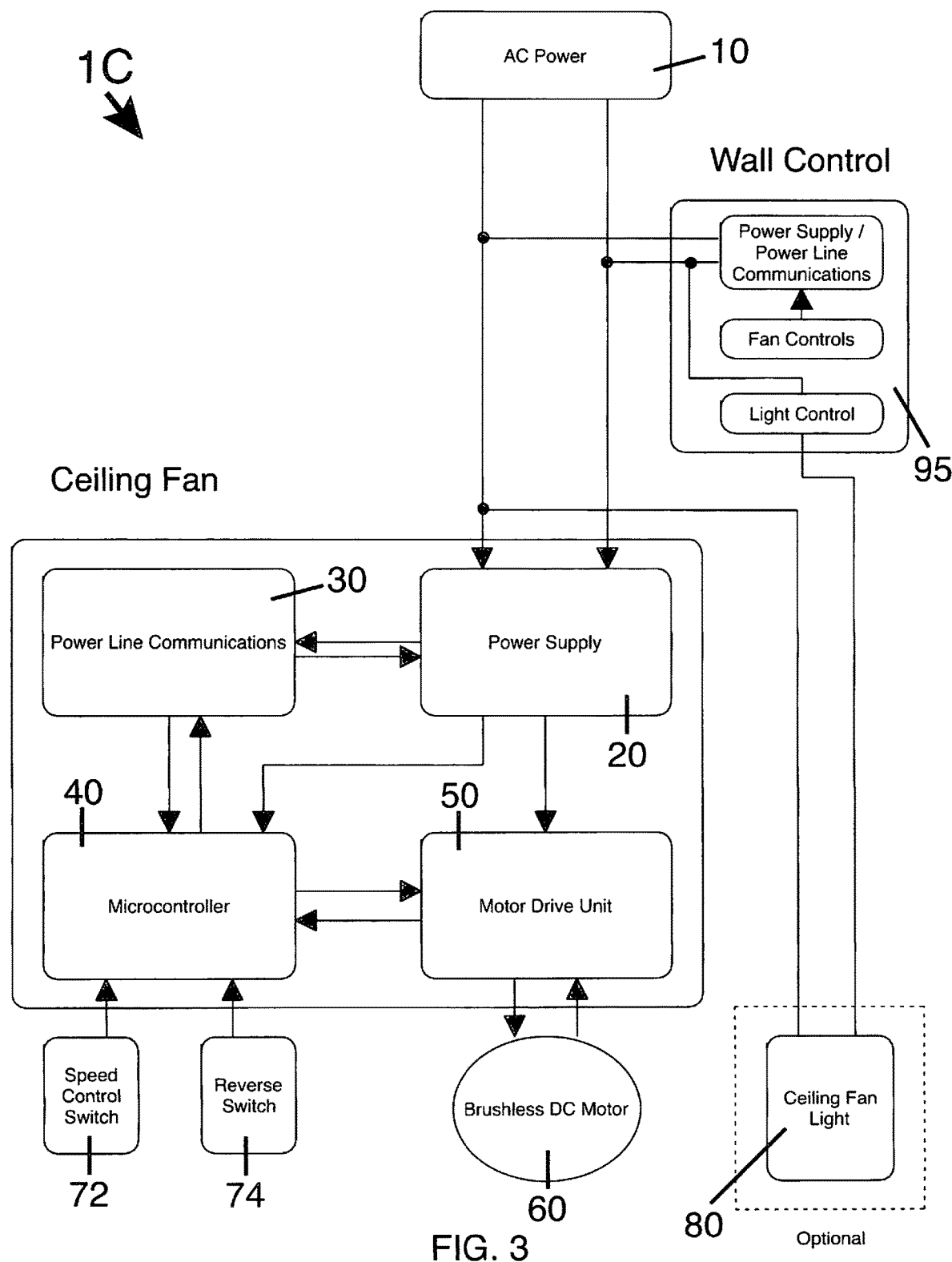
FIG. 3 is another block diagram of the first embodiment of FIG. 2 using a brushless DC motor with an AC powered ceiling fan, and wall control having fan controls and a light control.

FIG. 3 is a block diagram of another version 1C of the present invention shown in FIG. 1 using a brushless DC (direct current) motor 60 with an AC (alternating current) powered ceiling fan of FIG. 1 retrofitted with a wall control device 95.

The wall control device 95 can be located in a standard switch receptacle and control the ceiling fan through the power line communications 90. In addition to controlling the brushless DC motor as explained in the FIG. 2, this version of the wall control 95 can includes a light control module that can turn the ceiling fan light kit on and off as well as optionally dim the brightness of the light.

Second Embodiment

Figure 4:
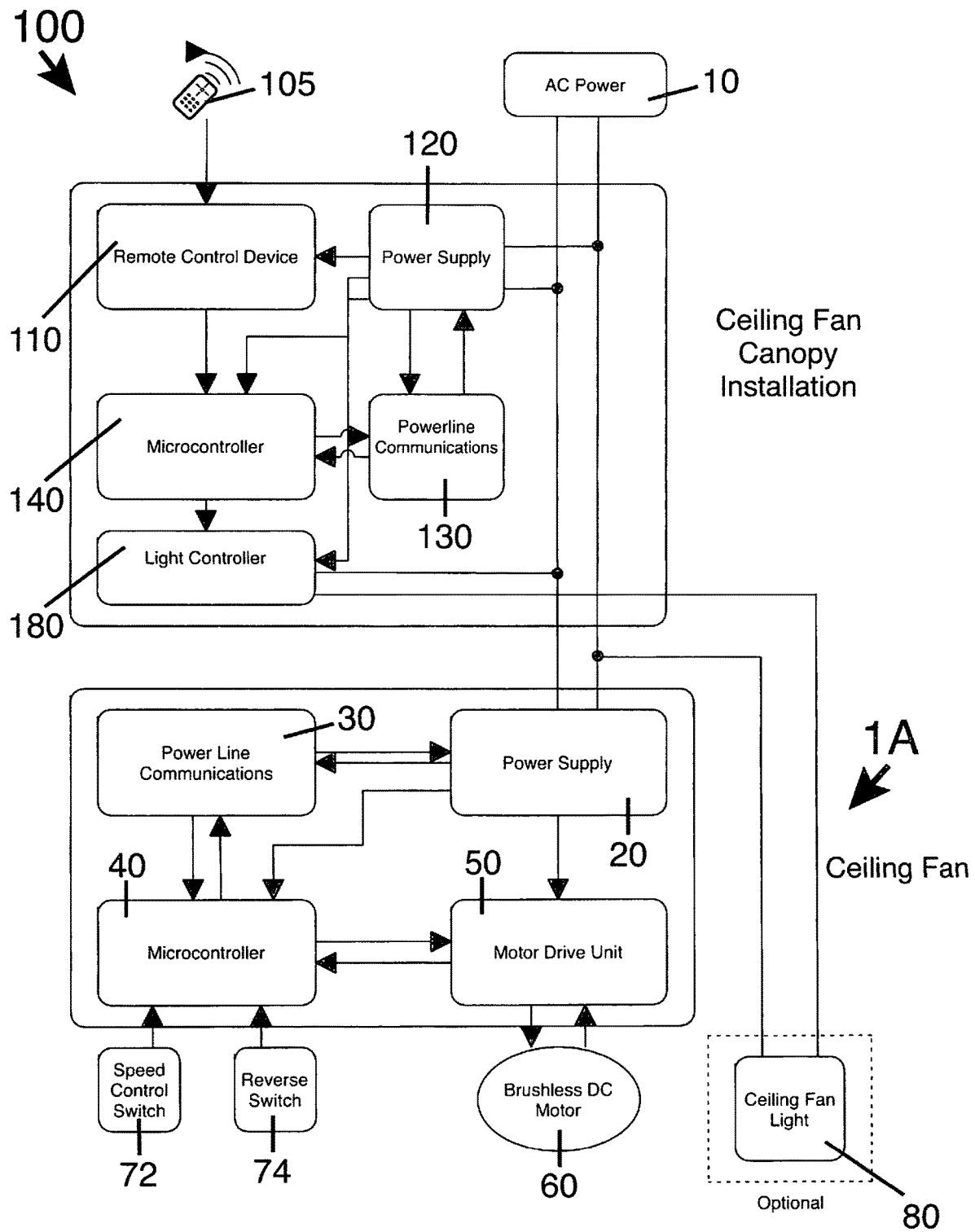
FIG. 4 is a block diagram of a second embodiment of the present invention using a brushless DC motor with an AC powered ceiling fan of FIG. 1 retrofitted with a single wireless control device.

FIG. 4 is a block diagram of a second embodiment 100 of the present invention using a brushless DC motor 60 with an AC powered ceiling fan of FIG. 1 retrofitted with a single wireless control device 105.

In this embodiment 100, the components shown in FIG. 1 can be located in the motor housing of the ceiling fan.

Inside of the ceiling fan canopy, a remote control device 110 (a receiver for receiving remote signals from wireless remote 105) is powered by an AC portion of the second internal power supply 120. The second internal power supply 120 (includes an AC/DC converter) that is connected to an external AC power supply 10 which converts external AC power to DC power.

A DC powered microcontroller 140 can be connected to the remote control device 110 and power supply 120, with a power line communications module 130 is connected to an AC portion of the second internal power supply 120 and the microcontroller 140. A light controller 180 can be connected between the power supply 120 and the optional fan light 80. Microcontroller 140 can be similar to microcontroller 40. Power line communications 130 can be similar to power line communications module 30.

Remote control 105 can send a signal such as an RF (radio frequency) to the remote control device 110 which sends a signal to the microcontroller 140 which interprets the signal to send signal to the powerline communications module 130. The powerline communications module 130 is coupled to the AC portion of the second internal power supply 120. The power line communications signal sends a signal through power supply 120 to 1A through the power supply 20 to the power line communications module 30. This sends the signal to the microcontroller 40 which operates the fan as previously described.

The remote control device 105 can send a signal to remote control device 110 which sends to the microcontroller 140 to light controller 180 which (controls turning the power on/off and/or dimming for ceiling fan light 80.

The portable handheld remote control 105 and the wireless remote control device 110 include similar devices such as those shown and described in U.S. Pat. No. 5,340,277 to Whitaker and U.S. Pat. No. 5,613,832 to Su which are incorporated by reference in their entirety.

The handheld remote control 105 can be used as a wireless remote device to turn the fan on and off, control different speeds of the rotating fan blades, and also change the fan blade rotation from clockwise to counter-clockwise and vice versa.

Wireless remote control 105 does not need to be a portable or handheld device and could be mounted inside a standard electrical switch receptacle box and communicate to remote control device 110 wirelessly.

Third Embodiment

Figure 5:
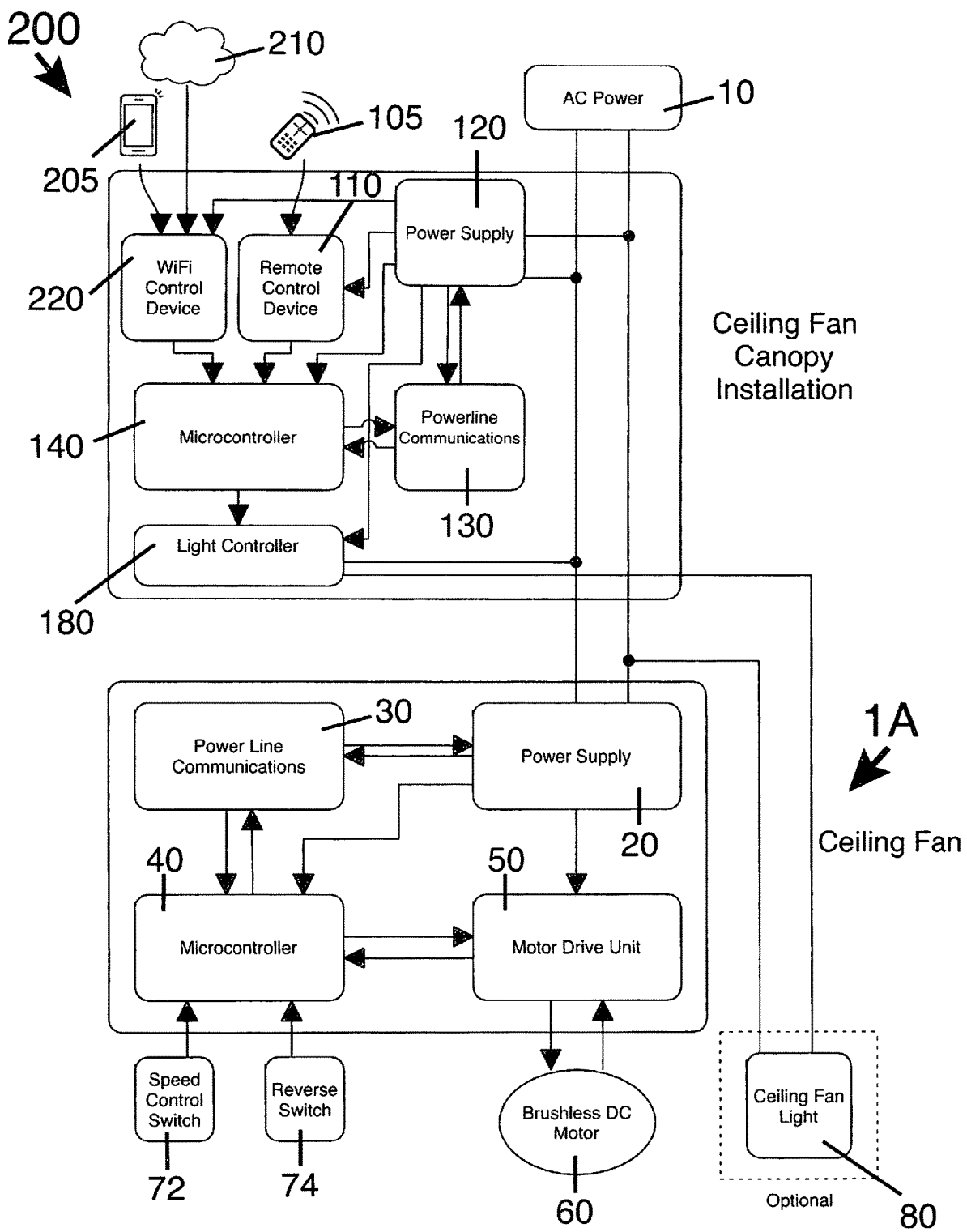
FIG. 5 is a block diagram of a third embodiment of the present invention using a brushless DC motor with an AC powered ceiling fan retrofitted with a single wireless control device shown in FIG. 2 along with a WiFi control device.

FIG. 5 a block diagram of a third embodiment 200 of the present invention using a brushless DC (direct current) motor 60 with an AC (alternating current) powered ceiling fan retrofitted with a single wireless control device shown 110 in FIG. 2 along with a WiFi control device 220.

A portable digital device 205 can include but not be limited to a smart phone, a tablet, a laptop computer, and the like.

The portable digital device 205 can be downloaded with an APP from a website. The purpose of the downloadable APP can be to allow the portable digital device 205 to communicate with a WiFi control device 220 installed inside of the ceiling fan canopy device. WiFi control device 220 can also receive controls from a cloud 210.

Although WIFI is referenced above, wireless transmission can be through various transmission mediums, such as but not limited to Bluetooth, WIFI, Zigbee, RF (radio frequency) and the like.

The types of wireless communications that can use portable digital devices, such as smart phones and the like, with wireless receivers, and Apps, can include those systems shown and described in U.S. Pat. No. 10,178,747 to Rivera et al., which is assigned to the same assignee as the subject application, and which is incorporated by reference in its' entirety.

Fourth Embodiment

Figure 6:
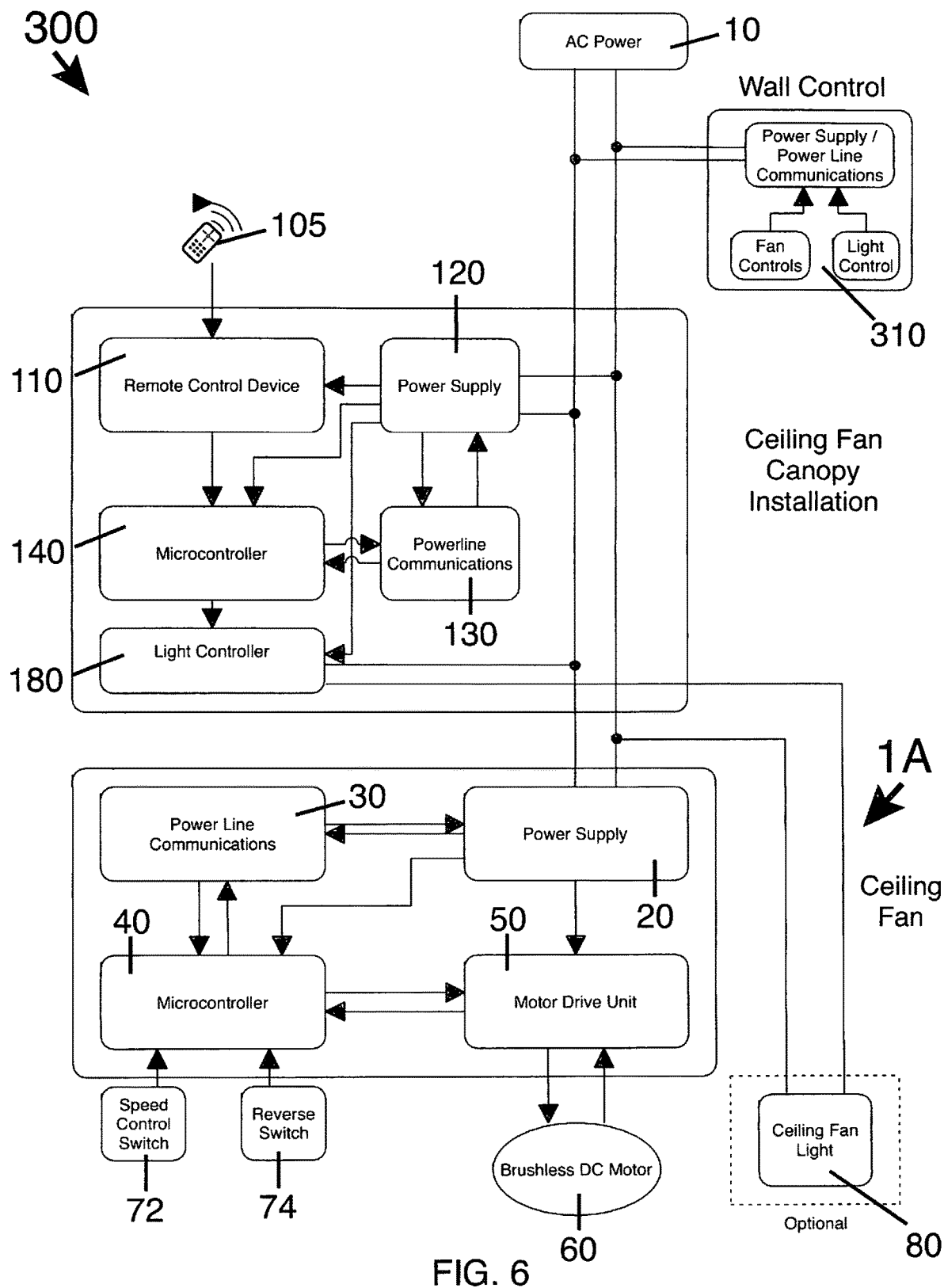
FIG. 6 is a block diagram of a fourth embodiment of an alternate wall control device having a light control that can send a signal through the power line communications module to control the operation on/off and optionally dimming of the light.

FIG. 6 is a block diagram of a fourth embodiment 300 which is a variation of the embodiment shown in FIG. 4 and having an alternate wall control device 310 with a light control that can send a signal through the power communications module to control the operations of the fan, such as on/off, reverse and speeds, and with or without controlling the ceiling fan lights (on/off with or without dimming of the ceiling fan light).

The wall control device 310 shown and described in FIG. 6 can also be hardwired and also be used with the embodiment shown in FIG. 5 to control the ceiling fan DC motor (such as on/off, reverse and speeds) and ceiling fan lights (on/off with or without dimming of the light).

The term "approximately" can be +/−10% of the amount referenced. Additionally, preferred amounts and ranges can include the amounts and ranges referenced without the prefix of being approximately.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A DC (direct current) motor controller for a ceiling fan, comprising:
    an internal power supply inside of a ceiling fan, the power supply having an AC (alternating current) to DC (direct current) converter for converting an external AC power supply to a DC power supply;
    a power line communications module inside the ceiling fan electrically connected to an AC (alternating current) portion of the internal power supply;
    a brushless DC (direct current) motor for rotating ceiling fan blades;
    a DC motor drive unit connected between a DC portion of the internal power supply and the brushless DC motor,
    a DC powered microcontroller connected between the power line communications module and the motor drive unit;
    a mechanical switch for operating the ceiling fan; and
    a single remote control device inside of a ceiling fan canopy;
    a second internal power supply inside the ceiling fan canopy for converting the external AC power supply to a second DC power supply;
    a second power line communications module inside the ceiling fan canopy connected to an AC portion of the second internal power supply;
    a second DC powered microcontroller connected between the second power line communications module and the single remote control device; and
    a wireless remote control device for communicating remotely with the single remote control device inside the ceiling fan canopy to control operating of the ceiling fan.

2. The DC motor controller of claim 1, wherein the mechanical switch includes at least one of:
    an on and off switch, a speed control switch and a reverse switch.

3. The DC motor controller of claim 1, wherein the mechanical switch includes:
    at least one pull chain switch.

4. The DC motor controller of claim 3, further comprising:
    a wireless remote control for controlling operation of the fan, wherein the fan is controlled by the at least one pull chain switch and the wireless remote control.

5. The DC motor controller of claim 1, further comprising:
    a ceiling fan light connected to the external AC power supply.

6. The DC motor controller of claim 1, further comprising:
    a ceiling fan motor housing for housing the internal power supply and the power line communications module and the brushless DC motor and the motor drive unit and the DC powered microcontroller.

7. The DC motor controller of claim 1, further comprising:
    a ceiling fan light connected to the external AC power supply.

8. The DC motor controller of claim 7, further comprising:
    a light controller inside the ceiling fan canopy connected between the second power supply for controlling the ceiling fan light by the wireless remote control.

9. The DC motor controller of claim 8, wherein the light controller controls turning the ceiling fan light on and off by the wireless remote control.

10. The DC motor controller of claim 9, further comprising:
    a wall mount control hardwired to the external AC power supply;
    fan controls on the wall mount control for controlling operation of the ceiling fan; and
    a light controller on the wall mount control for turning the ceiling fan light on and off.

11. The DC motor controller of claim 8, wherein the light controller controls dimming the ceiling fan light to different brightness levels by the wireless remote control.

12. The DC motor controller of claim 11, further comprising:
    a wall mount control hardwired to the external AC power supply;
    fan controls on the wall mount control for controlling operation of the ceiling fan; and
    a light controller on the wall mount control for dimming the ceiling fan light to different brightness levels.

13. The DC motor controller of claim 1, further comprising:
    a WiFi control device inside of the ceiling fan canopy; and
    a portable digital device for remotely operating the ceiling fan by communicating with the WiFi control device.

14. The DC motor controller of claim 13, wherein the portable digital device includes: a smart phone.

15. The DC motor controller of claim 13, further comprising:
    a ceiling fan light connected to the external AC power supply.

16. The DC motor controller of claim 15, further comprising:
    a light controller inside the ceiling fan canopy connected between the second power supply for turning the ceiling fan light on and off by the wireless remote control.

17. The DC motor controller of claim 16, further comprising:
    a wall mount control hardwired to the external AC power supply;

fan controls on the wall mount control for controlling operation of the ceiling fan; and a light controller on the wall mount control for turning the ceiling fan light on and off.

18. The DC motor controller of claim 16, further comprising:

a wall mount control hardwired to the external AC power supply;

fan controls on the wall mount control for controlling operation of the ceiling fan; and a light controller on the wall mount control for dimming the ceiling fan light to different brightness levels.

19. The DC motor controller of claim 15, further comprising:

a light controller inside the ceiling fan canopy connected between the second power supply for dimming the ceiling fan light to different brightness levels by the wireless remote control.

20. A method for providing a DC (direct current) motor controller for a ceiling fan, comprising the steps of:

providing an internal power supply inside of a ceiling fan, the power supply having an AC (alternating current) to DC (direct current) converter for converting an external AC power supply to a DC power supply;

providing a power line communications module inside the ceiling fan electrically connected to an AC (alternating current) portion of the internal power supply;

providing a brushless DC (direct current) motor for rotating ceiling fan blades;

providing a DC motor drive unit connected between a DC portion of the internal power supply and the brushless DC motor;

providing a DC powered microcontroller connected between the power line communications module and the motor drive unit;

providing a mechanical switch for operating the ceiling fan; and providing a single remote control device inside of a ceiling fan canopy;

a second internal power supply inside the ceiling fan canopy for converting the external AC power supply to a second DC power supply;

providing a second power line communications module inside the ceiling fan canopy connected to an AC portion of the second internal power supply;

providing a second DC powered microcontroller connected between the second power line communications module and the single remote control device; and providing a wireless remote control device for communicating remotely with the single remote control device inside the ceiling fan canopy to control operating of the ceiling fan.

* * * * *

EX PARTE REEXAMINATION CERTIFICATE (12253rd)
United States Patent
Lowe et al.

(10) Number: US 10,954,948 C1
(45) Certificate Issued: Mar. 27, 2023

(54) DC MOTOR CONTROLLER FOR CEILING FAN MOTOR AND LIGHTS

(71) Applicant: Chien Luen Industries Co., Ltd., Inc., Oakland Park, FL (US)

(72) Inventors: Tien S. Lowe, Cooper City, FL (US); Charles E. Bucher, Tampa, FL (US); Zachary Zauhar, Oakland Park, FL (US)

(73) Assignee: CHIEN LUEN INDUSTRIES CO., LTD., INC., Oakland Park, FL (US)

Reexamination Request:
No. 90/019,099, Jul. 19, 2022

Reexamination Certificate for:
Patent No.: 10,954,948
Issued: Mar. 23, 2021
Appl. No.: 16/524,948
Filed: Jul. 29, 2019

Related U.S. Application Data

(60) Provisional application No. 62/712,482, filed on Jul. 31, 2018.

(51) Int. Cl.
*F04D 25/08* (2006.01)
*F04D 27/00* (2006.01)
*H05B 47/19* (2020.01)
*F21V 33/00* (2006.01)
*G08C 17/00* (2006.01)

(52) U.S. Cl.
CPC .......... *F04D 25/088* (2013.01); *F04D 27/004* (2013.01); *F21V 33/0096* (2013.01); *G08C 17/00* (2013.01); *H05B 47/19* (2020.01); *G08C 2201/93* (2013.01)

(58) Field of Classification Search
None
See application file for complete search history.

(56) References Cited

To view the complete listing of prior art documents cited during the proceeding for Reexamination Control Number 90/019,099, please refer to the USPTO's Patent Electronic System.

*Primary Examiner* — Linh M Nguyen

(57) ABSTRACT

Systems, devices, controllers and methods for providing a DC (direct current) motor controller for ceiling fans, that can include retrofitting a DC motor controlled ceiling fan with a single remote control device. Another embodiment is for providing a DC motor controller for ceiling fans, that can include retrofitting a DC motor controlled ceiling fan with a single remote control device within the ceiling fan with a WiFi control device within the ceiling fan. Other embodiments can include using combinations of a wireless remote controller with a smart phone and with mechanical switches and/or with hardwired wall mounted controls, and the like.

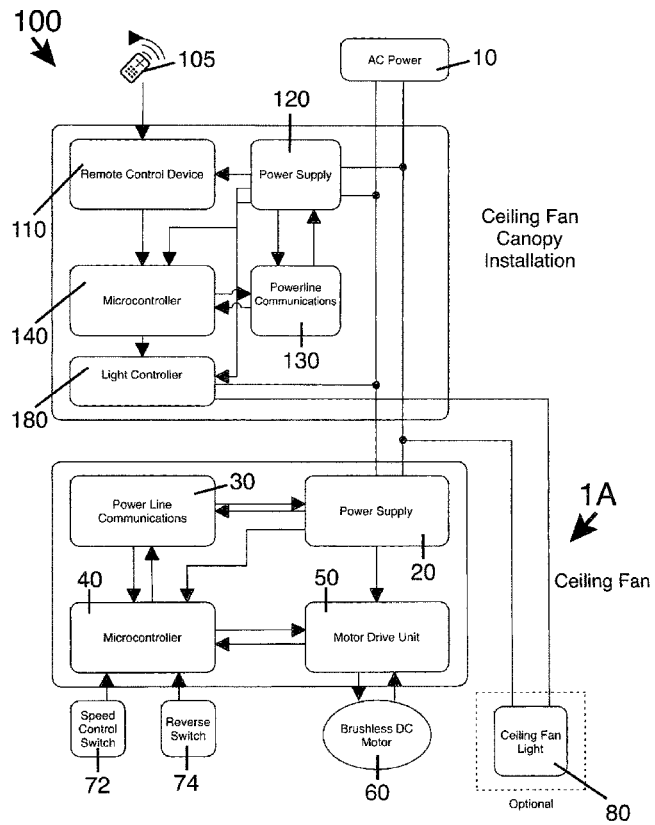

EX PARTE REEXAMINATION CERTIFICATE

NO AMENDMENTS HAVE BEEN MADE TO THE PATENT

AS A RESULT OF REEXAMINATION, IT HAS BEEN DETERMINED THAT:

The patentability of claims 1-20 is confirmed.

\* \* \* \* \*